United States Patent

Joji

[11] Patent Number: 5,082,174
[45] Date of Patent: Jan. 21, 1992

[54] HEATING APPARATUS FOR AUTOMOTIVE VEHICLE

[75] Inventor: Shimizu Joji, Atsugi, Japan

[73] Assignee: Nissan Motor Co., Ltd., Yokohama, Japan

[21] Appl. No.: 583,918

[22] Filed: Sep. 13, 1990

[30] Foreign Application Priority Data

Sep. 14, 1989 [JP] Japan .................. 1-239323

[51] Int. Cl.$^5$ ............................................ G05D 23/00
[52] U.S. Cl. .................... 237/2 A; 237/12.3 A; 165/104.11
[58] Field of Search ............ 237/12.3 A, 2 A, 12.3 C, 237/12.3 R; 165/104.11, 104.21, 104.22

[56] References Cited

U.S. PATENT DOCUMENTS 4,667,876  5/1987  Negishi .................. 237/2 A X
4,775,102 10/1988  Negishi .................. 237/2 A X

*Primary Examiner*—Henry A. Bennet
*Attorney, Agent, or Firm*—Pennie & Edmonds

[57] ABSTRACT

In a heating apparatus for an automotive vehicle including an evaporator disposed within an engine exhaust pipe; a condenser disposed within a heat core; and a looped heat pipe for feeding medium vapor (e.g. steam) from the evaporator to the condenser and medium liquid (e.g. water) from the condenser to the evaporator, the heating system comprises, in particular, a vapor pressure sensor; a vapor temperature sensor; a controller for detecting abnormal heat cycle condition on the basis of detected vapor pressure and temperature sensors; at least one exhaust gas bypass flapper; and a flapper actuator for actuating the flapper at such a position that exhaust gas is bypassed away from the evaporator in response to a presence of the stop signal from the controller. In case cracks are formed on both the evaporator and condenser sides, since there exists such a danger that exhaust gas is introduced into the vehicle room, when heat cycle condition is detected as being abnormal on the basis of detected vapor pressure and temperature, the flapper is so actuated that the evaporator will not be heated by exhaust gas to disable the heating system. Further, it is preferable to immediately discharge exhaust gas introduced into the heat pipe to the engine intake manifold in response to the stop signal.

5 Claims, 2 Drawing Sheets

HEATING APPARATUS FOR AUTOMOTIVE VEHICLE

BACKGROUND OF THE INVENTION

1. Field of the Invention

The present invention relates to a heating apparatus for an automotive vehicle, and more specifically to a heating system in which an ordinary heating apparatus for heating the vehicle room by warmed engine coolant and an additional heating apparatus for heating the same by engine exhaust gas are combined with each other.

2. Description of the Prior Art

An example of the heating system for an automotive vehicle in which an ordinary coolant-dependent heating apparatus and an additional exhaust gas-dependent heating apparatus are incorporated is disclosed in Japanese published Unexamined (Kokai) Patent Appli No. 59-16211, for instance.

In the prior-art heating system including an additional exhaust gas dependent heating apparatus; however, in case cracks or gaps are formed in the heating elements, for instance at the junction points between an evaporator pipe and an evaporator tank due to thermal fatigue or malsoldering, since medium vapor (e.g. steam) is jetted through the cracks or gaps and therefore the pressure drops down to the atmospheric pressure, there exists a problem in that the heating function of the additional heating apparatus is perfectly damaged.

In addition, in case cracks or gaps are formed at both the evaporator side and the condenser (i.e. heat exchanger) side, there exists a serious problem in that exhaust gas including carbon monoxide and introduced into the heat pipe is then discharged into the vehicle room.

SUMMARY OF THE INVENTION

With these problems in mind, therefore, it is the primary object of the present invention to provide a heating apparatus for an automotive vehicle which can disable the heating function of the additional exhaust gas dependent heating apparatus when an abnormal heat cycle condition is detected safety.

To achieve the above-mentioned object, the heating apparatus for an automotive vehicle according to the present invention comprises: (a) an evaporator (9) disposed within an engine exhaust passage (5); (b) a condenser (13) disposed within a heat core (2) facing a vehicle room; (c) a looped heat pipe (11) composed of a vapor feed pipe (14) for feeding medium evaporated by said evaporator to said condenser and a liquid return pipe (15) for returning medium condensed by said condenser to said evaporator; (d) a vapor pressure sensor (18) disposed in said vapor feed pipe, for detecting medium vapor pressure; (e) a vapor temperature sensor (19) also disposed in said vapor feed pipe, for detecting medium vapor temperature; (f) a controller (30) connected to said vapor pressure and temperature sensors, for detecting abnormal heat cycle condition on the basis of medium vapor pressure and temperature detected by said vapor pressure and temperature sensors and generating a stop signal whenever an abnormal heat cycle condition is detected; (g) a first exhaust gas bypass flapper (10) disposed on an upstream side of said evaporator; and (h) a flapper actuator (31) connected to said controller, for allowing said first bypass flapper to be pivoted so that exhaust gas is blown against said evaporator in response to an absence of the stop signal from said controller but to be pivoted so that exhaust gas is bypassed away from said evaporator in response to a presence of the stop signal from said controller. The controller detects an abnormal heat cycle condition by comparing relationship between detected medium vapor pressure and temperature with that between normal medium vapor pressure and temperature previously stored in said controller. The heating apparatus further comprises: (a) a liquid tank (16) disposed between said condenser and said evaporator; and (b) a first electromagnetic valve (17) disposed between said liquid tank and said evaporator and connected to said controller, said first electromagnetic valve 1 actuated closed in response to the stop signal to prevent liquid medium from flowing from said liquid tank to said evaporator. Further, it is preferable that the heating apparatus further comprises: (a) a second electromagnetic valve (26) disposed between an engine intake manifold and said looped heat pipe and connected to said controller; (b) a one-way electromagnetic valve (27) disposed in series to said electromagnetic valve and connected to said controller; and (c) said second electromagnetic valve and said one-way electromagnetic valve being both actuated open in response to a presence of the stop signal to discharge exhaust gas introduced into said looped heat pipe through cracks formed in said evaporator, into the engine intake manifold. Furthermore, it is preferable that the heating apparatus further comprises: a second exhaust gas bypass flapper (32) disposed on a downstream side of said evaporator and connected to said controller, said second exhaust gas bypass flapper being pivoted so that exhaust gas is passed through said evaporator in response to an absence of the stop signal from said controller but to be pivoted so that exhaust gas is bypassed away from said evaporator in response to a presence of the stop signal from said controller.

In the heating apparatus for an automotive vehicle according to the present invention, in case crack or gaps are formed at any elements of the heating system, since this abnormal heat cycle condition can be detected by the vapor pressure and temperature sensors and determined by the controller in accordance with previously stored normal relationship between the two, it is possible to easily stop the medium heat cycle. Therefore, it is possible to securely prevent exhaust gas introduced into the heat pipe from being discharged into the vehicle room, even if cracks are formed in the condenser, thus improving the safety of the heating system.

DETAILED DESCRIPTION OF THE PREFERRED EMBODIMENTS

A first embodiment of the heating system according to the present invention will be described in further detail hereinbelow with reference to the attached drawings.

Figure 1:
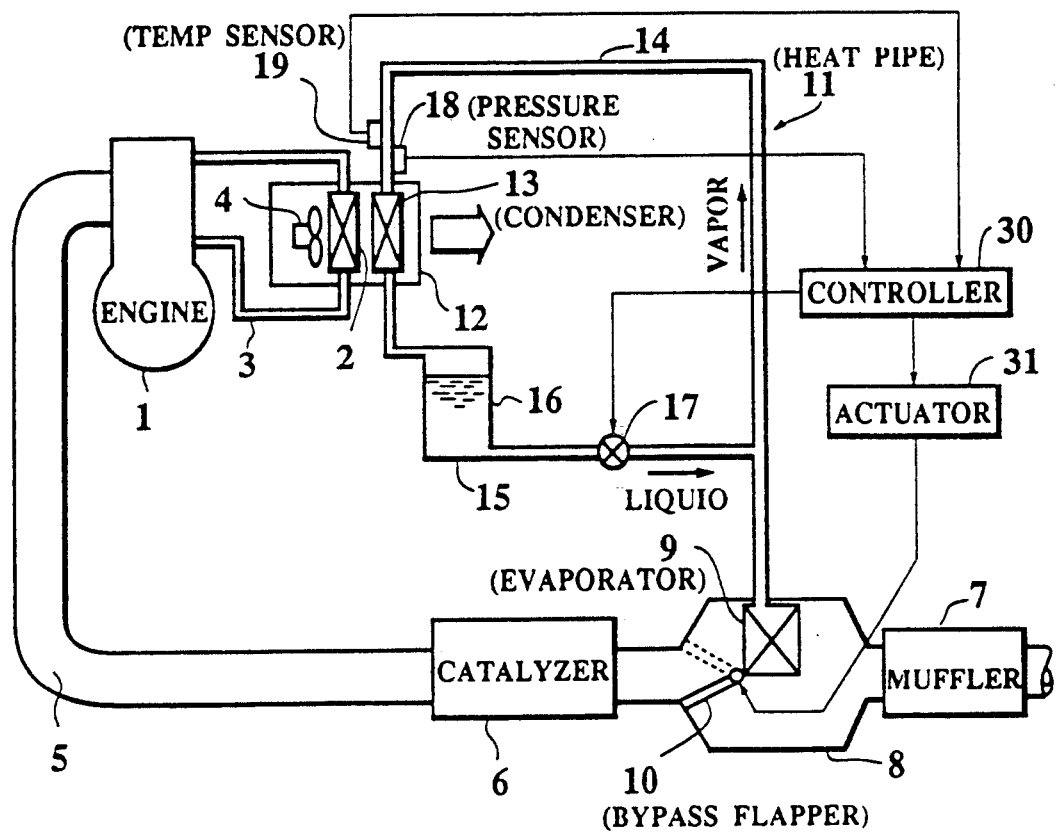
FIG. 1 is a diagrammatical system diagram, partly block diagram of a first embodiment of the heating apparatus according to the present invention.

In FIG. 1, the heating system comprises an ordinary coolant dependent heating apparatus and an additional exhaust gas dependent heating apparatus. The ordinary coolant dependent heating apparatus comprises an engine 1, a heater core 2 arranged within a vehicle room; a coolant passage 3 communicating between the engine 1 and the heater core 2 to circulate warmed engine coolant, and an air fan 4 for feeding air against the heater core 2 to exchange heat between the coolant and the air.

The additional exhaust gas dependent heating apparatus comprises an engine exhaust gas passage 5, a catalyzer 6, a muffler 7, a large-diameter exhaust gas passage 8 formed between the catalyzer 6 and the muffler 7, an evaporator 9, an exhaust gas bypass flapper 10, a looped heat pipe 11, a condenser 13, a liquid tank 16, and a first electromagnet valve 17. In more detail, the evaporator 9 is installed within the large-diameter exhaust passage 8 in eccentric positional relationship with respect to the center axis of the passage 8. The exhaust gas bypass flapper 10 is disposed on the upstream side of the evaporator. When actuated downward as shown by solid lines, this flapper 10 guides exhaust gas toward the evaporator 9, and when actuated upward as shown by dashed lines, this flapper 10 guides exhaust gas directly toward the muffler 7. The looped heat pipe 11 is composed of a vapor feed pipe 14 extending from the evaporator 9 to the condenser 13 to feed medium (e.g. steam) evaporated by the evaporator 9 to the condenser 13 and a liquid return pipe 15 extending from the condenser 13 to the evaporator 9 to return medium (e.g. water) condensed by the condenser to the evaporator 9. The condenser 13 is mounted on the air jet side 12 of the heater core 2 facing a vehicle room and connected between the vapor feed pipe 14 and the liquid return pipe 15. The liquid tank 16 is provided midway in the liquid return pipe 15 or between the condenser 13 and the evaporator 9. The electromagnetic valve 17 is disposed between the liquid tank 16 and the evaporator 9 and closed to prevent the medium (e.g. liquid) from being returned to the evaporator 9 under abnormal heat cycle condition.

The feature of the heating apparatus according to the present invention is to further comprises a vapor pressure sensor 18, a vapor temperature sensor 19 both disposed within the vapor feed pipe 14 on the upstream side of the condenser 13, a controller 30 connected to the vapor pressure and temperature sensors 18 and 19 and the electromagnetic valve 17, and an actuator 31 connected to the controller 30 to actuate the exhaust gas bypass flapper 10.

The controller 30 previously stores a table indicating normal relationship between temperature and pressure of the circulated medium (e.g. steam), checks whether the heating apparatus operates normally by comparing relationship between detected vapor pressure and temperature with that between normal vapor pressure and temperature previously stored, and generates a stop signal to the actuator 31 when an abnormal heat cycle condition is detected on the basis of the detected vapor pressure and temperature detected by these two sensors 18 and 19. That is, when the heating apparatus operates normally, since vapor pressure increases with increasing vapor temperature in accordance with predetermined relationship, the controller 30 can determine a normal heat loop cycle by table look-up method on the basis of the detected vapor temperature and pressure.

Figure 2:
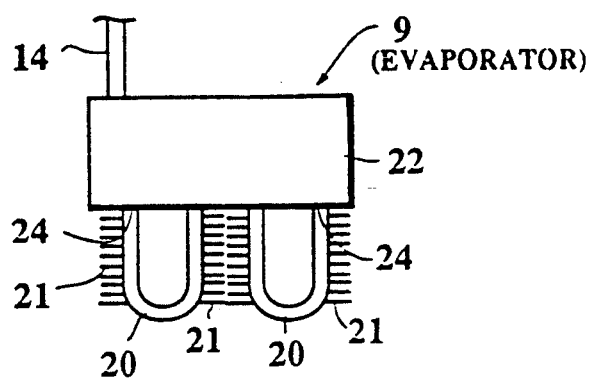
FIG. 2 is a front view showing an example of an evaporator mounted within an exhaust gas pipe shown in FIG. 1.

FIG. 2 shows the evaporator 9 in further detail, which comprises two U-shaped pipes 20 each formed with a plurality of fins 21, and an evaporator tank 22. The medium (e.g. water) condensed by the condenser 13 is circulated through these pipes 20. In the evaporator 9 as described above, there exist troubles such that cracks are formed at the pipes 20 due to thermal fatigue or gaps are produced at the junction points 24 between the evaporator tank 22 and the pipes 20 due to malsoldering, so that vapor leaks through cracks or gaps and therefore vapor pressure within the looped heat pipe 11 decreases down to the atmospheric pressure in spite of a higher medium (e.g. steam) temperature.

The operation of the heating apparatus according to the present invention will be described hereinbelow. When the heating apparatus operates under normal heat cycle conditions without leaking vapor through cracks or gaps formed at the evaporator 9 or other elements, the relationship between temperature and pressure of the circulated vapor is maintained normally. Therefore, the controller 30 outputs no stop signal to the actuator 31, so that the exhaust gas flapper 10 is pivoted down as shown by solid lines in FIG. 1. As a result, exhaust gas is introduced toward the evaporator 9 to heat the liquid medium (e.g. water) in the evaporator 9 into the vapor medium (e.g. steam). The vapor medium generated by the evaporator 9 is introduced into the condenser 13 via the vapor feed pipe 14 and condensed again into the liquid medium therethrough. Since the liquid medium is transformed into the vapor medium by absorbing latent heat from exhaust gas within the evaporator 9, and the vapor medium is transformed into the liquid medium by releasing the latent heat by the air blown against the condenser 13, warm air is introduced into the vehicle room. The condensed medium is returned to the evaporator 9 via the liquid tank 16, the normally open electromagnetic value 17, and the liquid return pipe 15.

On the other hand, when the heating apparatus operates under abnormal heat cycle condition because vapor leaks through cracks or gaps formed at the evaporator 9 or other elements, the vapor pressure drops abnormally down to the atmospheric pressure in spite of high vapor temperature. Therefore, the controller 30 outputs a stop signal to the actuator 31 because the abnormal relationship between pressure and temperature can be detected by table look-up method, so that the exhaust gas flapper 10 is pivoted up as shown by dashed line in FIG. 1. As a result, exhaust gas is not introduced toward the evaporator 9 without heating the medium in the evaporator 9 and further the electromagnetic valve 17 is closed to prevent the liquid medium within the liquid tank 16 from flowing downward into the evaporator 9 and further leaking outside.

Figure 3:
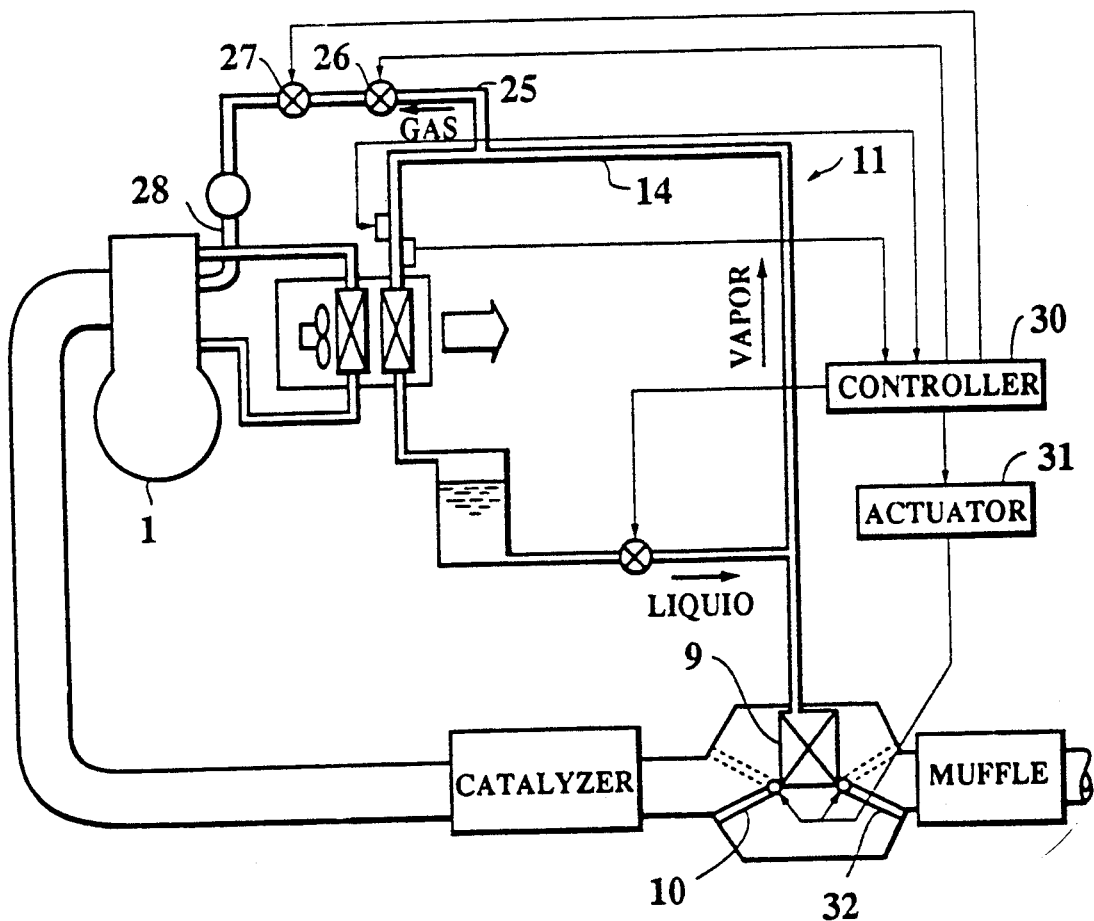
FIG. 3 is a similar diagrammatical system diagram of a second embodiment according to the present invention.

FIG. 3 shows a second embodiment thereof, in which a subpipe 25 is further connected between an intake manifold 28 of the engine L and the vapor feed pipe 14, and a second electromagnetic valve 26 and a one-way electromagnetic valve 27 are provided midway in this subpipe 25. In this embodiment, even if exhaust gas enters the vapor feed pipe 14 through the cracks formed at the evaporator 9, since the controller 30 detects the abnormal conditions and opens the second electromagnetic valve 26 and the one-way electromagnetic valve 27, exhaust gas can be immediately discharged from the heat pipe 11 into the engine 1. Further, the one-way electromagnetic valve 27 serves to prevent exhaust gas from flowing backward into the vapor feed pipe 14 when the pressure within the intake manifold rises beyond the atmospheric pressure. In this embodiment, in case cracks are formed at both the evaporator 9 and the condenser 13, since exhaust gas within the heat pipe 14 can be discharged into the engine 1 immediately, it is possible to securely prevent exhaust gas from being introduced into the vehicle room.

Further, in FIG. 3, another exhaust gas bypass flapper 32 is provided on the downstream side of the evaporator 9 in addition to the exhaust gas flapper 10 to further securely prevent the evaporator 9 from being heated by exhaust gas by pivoting the flapper 32 upward, when the controller detects an abnormal heat cycle condition.

As described above, in the heating system including an exhaust gas dependent heating apparatus for an automotive vehicle according to the present invention, since vapor temperature and pressure sensors are provided within the heat pipe of the heating apparatus, it is possible to detect abnormal heat cycle condition such as leakage of medium through cracks or gaps formed due to thermal fatigue. Upon abnormal heat cycle condition detection, the exhaust gas flapper is so actuated that the evaporator is not heated by exhaust gas; that is, the heating apparatus is disabled. In case cracks are formed both on the evaporator and condenser sides, since exhaust gas is introduced into the vehicle room, the abnormal condition is extremely dangerous for the driver and passengers. In the present invention, however it is possible to securely prevent the above-mentioned accident, by immediately discharging the exhaust gas within the heat pipe, thus improving the safety of the heating system including the exhaust gas dependent heating apparatus.

What is claimed is:

1. A heating apparatus for an automotive vehicle, comprising:
   (a) an evaporator disposed within an engine exhaust passage;
   (b) a condenser disposed within a heat core facing a vehicle room;
   (c) a looped heat pipe composed of a vapor feed pipe for feeding medium evaporated by said evaporator to said condenser and a liquid return pipe for returning medium condensed by said condenser to said evaporator;
   (d) a vapor pressure sensor disposed in said vapor feed pipe, for detecting medium vapor pressure;
   (e) a vapor temperature sensor also disposed in said vapor feed pipe, for detecting medium vapor temperature;
   (f) a controller connected to said vapor pressure and temperature sensors, for detecting abnormal heat cycle condition on the basis of medium vapor pressure and temperature detected by said vapor pressure and temperature sensors and generating a stop signal whenever an abnormal heat cycle condition is detected;
   (g) a first exhaust gas bypass flapper disposed on an upstream side of said evaporator; and
   (h) a flapper actuator connected to said controller, for allowing said first bypass flapper to be pivoted so that exhaust gas is blown against said evaporator in response to an absence of the stop signal from said controller but to be pivoted so that exhaust gas is bypassed away from said evaporator in response to a presence of the stop signal from said controller.

2. The heating apparatus for an automotive vehicle of claim 1, wherein said controller detects an abnormal heat cycle condition by comparing relationship between detected medium vapor pressure and temperature with that between normal medium vapor pressure and temperature previously stored in said controller.

3. The heating apparatus for an automotive vehicle of claim 1, which further comprises:
   (a) a liquid tank disposed between said condenser and said evaporator; and
   (b) a first electromagnetic valve disposed between said liquid tank and said evaporator and connected to said controller, said first electromagnetic valve being actuated closed in response to the stop signal to prevent liquid medium from flowing from said liquid tank to said evaporator.

4. The heating apparatus for an automotive vehicle of claim 1, which further comprises:
   (a) a second electromagnetic valve disposed between an engine intake manifold and said looped heat pipe and connected to said controller;
   (b) a one-way electromagnetic valve disposed in series to said electromagnetic valve and connected to said controller; and
   (c) said second electromagnetic valve and said one-way electromagnetic valve being both actuated open in response to a presence of the stop signal to discharge exhaust gas introduced into said looped heat pipe through cracks formed in said evaporator, into the engine intake manifold.

5. The heating apparatus for an automotive vehicle of claim 1, which further comprises a second exhaust gas bypass flapper disposed on a downstream side of said evaporator and connected to said controller, said second exhaust gas bypass flapper being pivoted so that exhaust gas is passed through said evaporator in response to an absence of the stop signal from said controller but to be pivoted so that exhaust gas is bypassed away from said evaporator in response to a presence of the stop signal from said controller.

* * * * *